Figure 1:
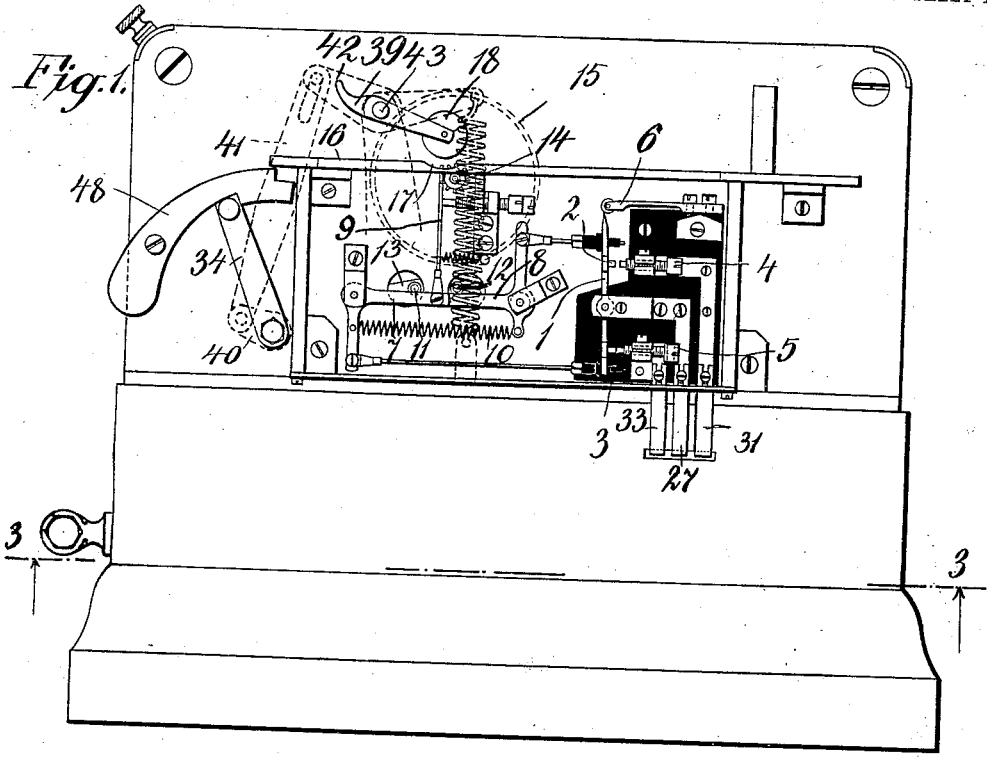

No. 886,339.

J. C. BARCLAY.

AUTOMATIC TELEGRAPH TRANSMITTER.

APPLICATION FILED JULY 22, 1907.

PATENTED MAY 5, 1908.

2 SHEETS—SHEET 1.

WITNESSES:
D. H. Davies
Frank Coffman

INVENTOR
J. C. Barclay
BY
H. M. Marble
ATTORNEY

No. 886,339.
J. C. BARCLAY.
AUTOMATIC TELEGRAPH TRANSMITTER.
APPLICATION FILED JULY 22, 1907.
PATENTED MAY 5, 1908.
2 SHEETS—SHEET 2.
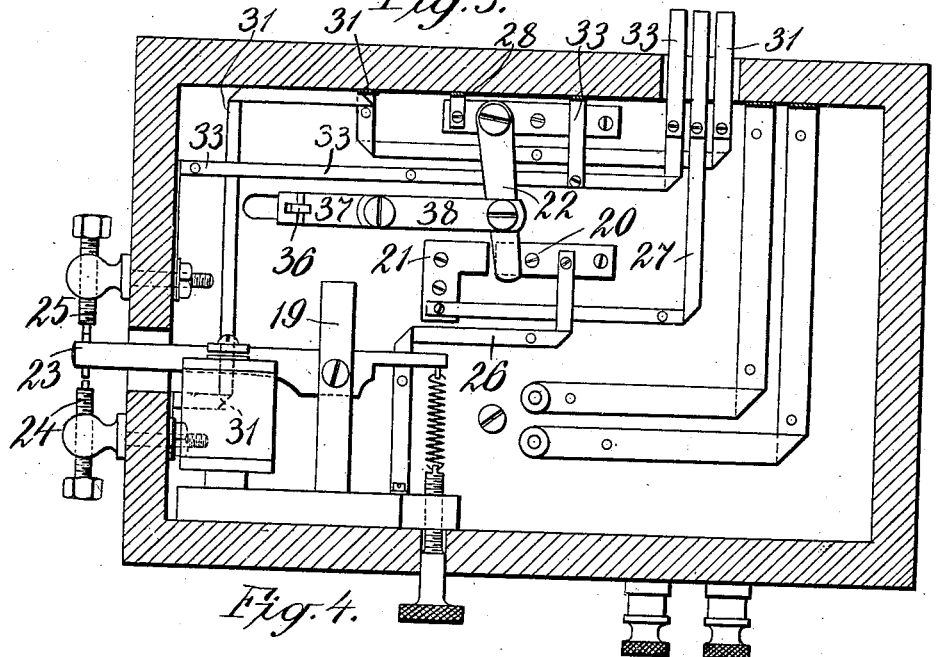
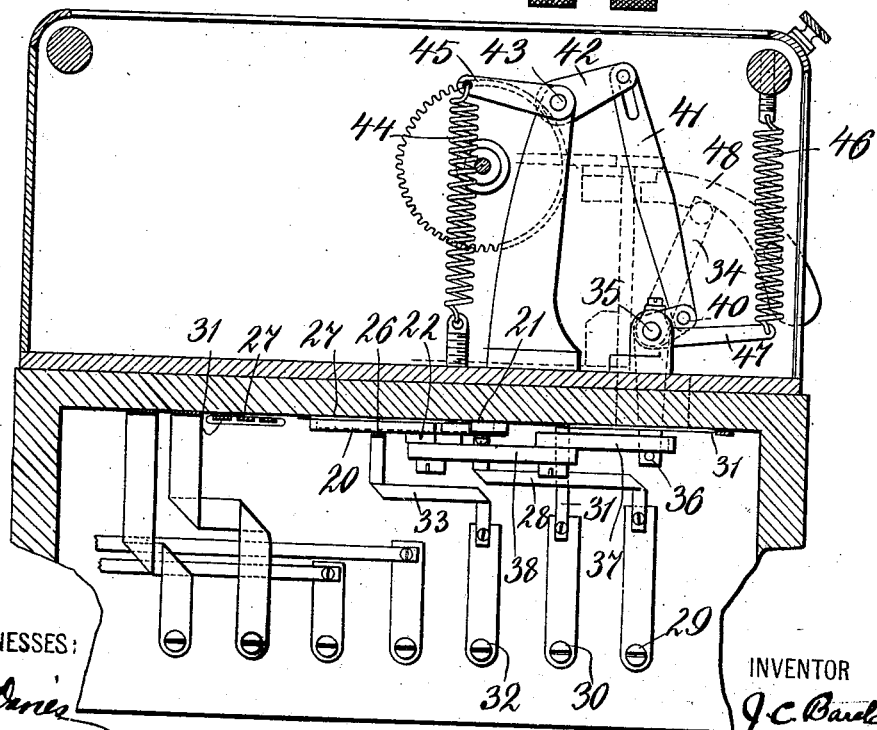
WITNESSES:
INVENTOR
J. C. Barclay
BY
H. M. Marble
ATTORNEY

UNITED STATES PATENT OFFICE.

JOHN C. BARCLAY, OF NEW YORK, N. Y.

AUTOMATIC TELEGRAPH-TRANSMITTER.

No. 886,339.       Specification of Letters Patent.       Patented May 5, 1908.

Application filed July 22, 1907. Serial No. 384,998.

*To all whom it may concern:*

Be it known that I, JOHN C. BARCLAY, a citizen of the United States, residing at New York, in the county of New York and State of New York, have invented certain new and useful Improvements in Automatic Telegraph-Transmitters; and I do hereby declare the following to be a full, clear, and exact description of the same, such as will enable others skilled in the art to which it appertains to make and use the same.

My invention relates to automatic telegraph transmitters and particularly to that type thereof in which the transmitting mechism is controlled by a suitably marked or perforated message strip.

The well known Wheatstone telegraph transmitter is an example of the type of transmitters to which my invention pertains and I will describe my invention hereafter as applied to the Wheatstone transmitter.

Automatic transmitters of the class referred to usually comprise, or have in immediate connection with them, hand operated transmitting means and a switch by the throwing of which either the hand operated transmitting means or the automatic transmitting means may be connected to the line at will. In one well known form of Wheatstone transmitter for example, a pole changing transmitter adapted to be operated by a hand key is located in the base of the instrument and a switch is provided as a part of the mechanism of the transmitter whereby either the contact points of the Wheatstone transmitting mechanism or the contact points of the hand operated transmitter may be connected to the line at will. It has been found in the use of these transmitters that sometimes the operator throws the said switch to place the hand operated transmitter in circuit, without simultaneously stopping the feeding of the message tape through the automatic transmitter. The result of this is that a greater or less length of the message tape passes through the machine without the transmission of the corresponding message through the line; and this may cause the loss of a considerable portion of what was intended to be transmitted automatically; a loss which it is difficult to trace.

According to my invention I so connect the said switch and the feeding mechanism of the automatic transmitter that it is impossible to throw the switch to place the contact points of the hand operated transmitter in circuit, without simultaneously stopping the feeding of the message tape through the automatic transmitter, and, vice versa, so that the throwing of the switch into position to place the contact points of the automatic transmitter in circuit immediately starts the feeding of the tape, if a tape be in the machine.

The accompanying drawings illustrate my invention as applied to a Wheatstone transmitter.

Figure 2:
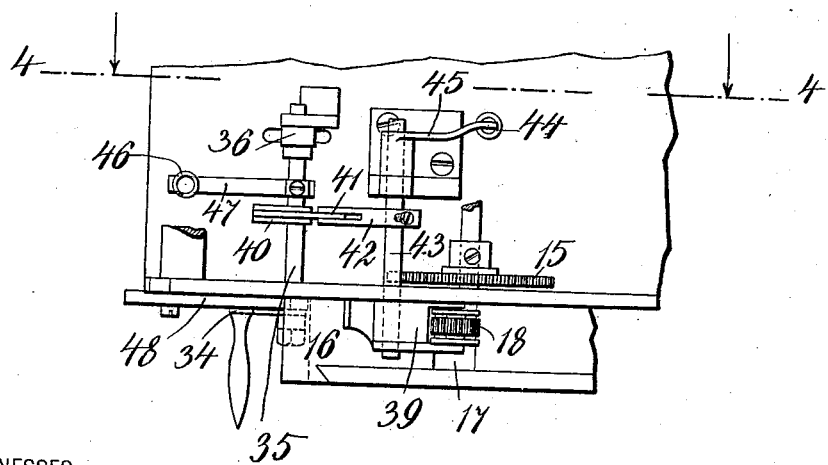

In said drawings: Figure 1 shows a side elevation of a well known form of Wheatstone transmitter, and, in dotted lines, illustrates means employed for connecting the said switch and said feeding mechanism so that the two are operated simultaneously by the switch lever; Fig. 2 is a top view of a portion of the said mechanism of the transmitter showing particularly the means for connecting said switch and feeding mechanism; Fig. 3 shows a view from below of the current leads and switch mechanism of the transmitter, and also shows the hand operated transmitter; and Fig. 4 shows a longitudinal section through the transmitter, taken on the line 4—4 of Fig. 2, the driving mechanism of the transmitter being omitted.

I do not show in any of these views the driving and governing mechanism of the Wheatstone transmitter, as this mechanism is well known. I have, however, shown the contact mechanism characteristic of the Wheatstone transmitter, the same comprising a rocker 1 having contact points 2 and 3 arranged to make contact alternately with contact stops 4 and 5 respectively, a spring jockey 6, and bell cranks 7 and 8 having mounted thereon fingers 9 (there being customarily two of these fingers placed one behind the other, for which reason only one is seen in Fig. 1;) one of said fingers being mounted upon bell crank 7 and the other upon bell crank 8; said bell cranks being arranged to be vibrated alternately against the tension of a spring 10 by pins 11 and 12 respectively, mounted upon a pivoted rocker 13 oscillated by suitable driving mechanism not shown. I have further shown the usual star wheel 14 for feeding the tape forward, said star wheel being operated, as is well known, in synchronism with the movements of the rocker 13; but of the driving mechanism for such star wheel I have indicated merely the customary gear wheel 15. I have further shown the feed table 16 over which the message strip or tape is fed; said table having in it a depression 17, the points of the star wheel 14 and of the fingers 9 customarily projecting up through slots in table 16 located within this depression portion 17. I have further shown the usual toothed idler roller 18 arranged to press the tape down against the teeth of the star wheel when the tape is to be fed forward, the said idler being at other times elevated so as not to engage the tape and being shown in such elevated position in the drawings.

19, (Fig. 3) is the customary pole changing transmitter, mounted in the base of the instrument, and having magnets intended to be connected in a local key-circuit whereby this transmitter 19 may be operated by an ordinary hand key.

20 and 21 are contact blocks and 22 is a contact arm of a switch whereby either the contact pieces 1, 4 and 5 of the automatic mechanism or the contact pieces 23, 24 and 25 of the key operated transmitter 19, may be connected to a line circuit, at will; contact block 20 being connected by a current lead 26, to the base of transmitter 19 and so to the armature contact 23 thereof, contact block 21 being connected by a current lead 27 to the contact rocker 1 of the Wheatstone mechanism, and contact arm 22 being connected by current lead 28 to a line terminal 29.

A battery terminal 30 is connected by current lead 31 to contact stop 4 of the Wheatstone transmitting mechanism and also to contact stop 24 of the transmitter 19; and a second battery terminal 32 is connected by a current lead 33 to contact stop 5 of the Wheatstone transmitting mechanism and to contact stop 25 of the hand operated transmitter 19. It will be seen that according as switch lever 22 is on contact block 20 or contact block 21, the current will pass from line terminal 29 through current lead 28 and said switch lever 22 to block 20, current lead 26 and contact member 23 of the hand operated transmitter 19, or to contact block 21, current lead 27, and contact piece 1 of the Wheatstone transmitting mechanism. In practice terminal 29 is connected to line and battery terminals 30 and 32 are connected to opposite end terminals of a battery or equivalent generator grounded in the middle so that the operation of the Wheatstone contact mechanism or of the hand operated transmitter 19 causes reversals of the line polarity.

Switch arm 22 is operated by means of a hand lever 34 (Figs. 1, 2 and 4) connected to a rock shaft 35 upon which rock shaft there is a downwardly projecting arm 36 connected by links 37 and 38 to the switch arm 22 and therefore arranged to move said switch arm to the one side or the other when said hand lever 34 is operated.

The paper feed idler 18 is mounted as customary upon a pivoted arm 39, the end of which arm is formed as a thumb piece to facilitate raising and lowering of the said idler 18.

In so far as yet described the mechanism shown is that of an ordinary Wheatstone transmitter. To so connect the device for operating the switch arm 22, and the arm 39 of the idler 18, that the transmitter 19 may not be thrown into circuit without stopping the feeding of the paper strip, I provide on rock shaft 35 an arm 40 connected by a link 41 with an arm 42 on the rock shaft 43 on which the arm 39 of idler 18 is mounted; and I provide a spring 44 acting through arm 45 on rock shaft 43 and tending to press idler 18 down toward the table 16, and I further provide a spring 46 acting through arm 47 upon rock shaft 35 and tending to hold switch arm 22 in contact with the contact block 21 connected with the automatic transmitting contact mechanism. I further provide a latch lever 48 (Figs. 1, 2 and 4) adapted to hold the hand lever 34 back against the tension of springs 46 and 44, when the transmitter 19 is to be connected to the line.

It will be seen that the connections between the rock shaft 35 of the switch mechanism and the rock shaft 43 of the paper feed mechanism are such that the hand lever 34 cannot be operated to move the switch arm 22 into contact with contact block 20 (thereby placing the transmitter 19 in the line circuit) without likewise raising the paper feed idler from the table 16 and so stopping the feeding of the message tape; and it will be seen that the latch 48 cannot be released and the hand lever 34 thereby permitted to move back to position to throw the automatic transmitting mechanism into line again, without lowering the paper feed idler 18 so that a message strip then in the machine will be fed forward again.

What I claim is:—

1. An automatic telegraph transmitter comprising in combination message feeding mechanism, automatic transmitting contact mechanism and means for operating the same, an independent transmitter arranged to be separately controlled, a switch for connecting either the automatic transmitting mechanism or the separate transmitter to line at will, and automatic stopping and starting means for said feeding mechanism controlled both as to stopping and as to starting by said switch.

2. An automatic telegraph transmitter comprising in combination message feeding mechanism, automatic transmitting contact mechanism and means for operating the same, an independent transmitter arranged to be separately controlled, a switch for connecting either the automatic transmitting mechanism or the separate transmitter to line at will, and automatic stopping and starting means for said feeding mechanism, mechanically connected with said switch, whereby said automatic stopping means is operated thereby both for stopping and for starting.

3. A telegraph transmitter comprising in combination automatic transmitting mechanism, message feeding mechanism comprising an idler arranged to be moved into and out of operative position, an independent transmitter, a switch for throwing either said independent transmitter or said automatic transmitting mechanism into the line circuit at will, and means mechanically connecting said switch mechanism and idler arranged to move said idler out of operative position when said switch is operated to throw the automatic transmitting mechanism out of the line.

4. A telegraph transmitter comprising in combination a message table, means for feeding a message strip thereover, adjustable pressure means for holding such strip in engagement with said feeding means, automatic transmitting mechanism arranged to be controlled by such message strip, an independent transmitter, a switch for throwing either said independent transmitter or said automatic transmitting mechanism into the line circuit at will, and means mechanically connecting said switch mechanism and pressure means arranged to free said pressure means from the strip when said switch is operated to disconnect the automatic transmitting devices from the line.

5. A telegraph transmitter comprising in combination a message table, feeding means for feeding a message strip thereover, an idler roller arranged to hold such strip in engagement with said feeding means, an independent transmitter, a switch shaft, a switch operated thereby arranged to connect either the automatic transmitting mechanism or the separate transmitter to line at will, a rock shaft on which said idler is mounted and lever arms on said switch shaft and rock shaft, and a link connecting the same, whereby said idler and switch are operated together.

In testimony whereof I affix my signature in the presence of two witnesses.

JOHN C. BARCLAY.

Witnesses.
C. A. VAN BRUNT,
H. M. MARBLE.